(12) United States Patent
Le Taillandier De Gabory et al.

(10) Patent No.: US 10,205,528 B2
(45) Date of Patent: Feb. 12, 2019

(54) OPTICAL TRANSMITTER AND OPTICAL COMMUNICATION METHOD

(71) Applicant: NEC Corporation, Minato-ku, Tokyo (JP)

(72) Inventors: Emmanuel Le Taillandier De Gabory, Tokyo (JP); Hidemi Noguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/558,799

(22) PCT Filed: Mar. 20, 2015

(86) PCT No.: PCT/JP2015/001573
§ 371 (c)(1),
(2) Date: Sep. 15, 2017

(87) PCT Pub. No.: WO2016/151615
PCT Pub. Date: Sep. 29, 2016

(65) Prior Publication Data
US 2018/0076900 A1 Mar. 15, 2018

(51) Int. Cl.
*H04B 10/04* (2006.01)
*H04B 10/516* (2013.01)
*H04B 10/588* (2013.01)

(52) U.S. Cl.
CPC ......... *H04B 10/516* (2013.01); *H04B 10/588* (2013.01)

(58) Field of Classification Search
CPC .. H04B 10/516; H04B 10/505; H04B 10/504; H04B 10/50; H04B 10/50572;
(Continued)

(56) References Cited

U.S. PATENT DOCUMENTS 5,161,044 A * 11/1992 Nazarathy ............... H04B 1/62
398/194
5,850,305 A * 12/1998 Pidgeon ............ H04B 10/5051
398/193
(Continued)

FOREIGN PATENT DOCUMENTS

| EP | 2645599 A1 | 10/2013 |
| JP | 2014103594 A | 6/2014 |
| WO | 2014162649 A1 | 10/2014 |

OTHER PUBLICATIONS

Vasconcelos, C.K.H., et al., "Signal Predistortion for Nonlinear Transmitters in Direct-Detection OFDM over Multimode Fibers", 2014, International Telecommunications Symposium, pp. 1-5 (5 pages).

*Primary Examiner* — Hibret Woldekidan

(57) ABSTRACT

It is impossible to compensate non-linearity in an optical transmitter during operations, therefore, an optical transmitter according to an exemplary aspect of the invention includes a selective addition means for adding a coefficient to digital data to be transmitted if the digital data being included in one of data intervals of predetermined number, the predetermined number being integer more than one, and for changing the coefficient with a period longer than the symbol period of the data transmitted by the optical transmitter; a data processing means for processing the digital data by using a parameter; a driving signal means for generating a driving signal from the digital data adjusted by the selective addition means and the data processing means; a modulating means for modulating light into lightwave signal by the driving signal; and a control means for receiving a monitor signal obtained by monitoring the lightwave signal having a frequency component determined by the period of changing the added coefficients, and for modifying (Continued)

the parameter of the data processing means in order for the monitor signal to reach an extremum.

18 Claims, 12 Drawing Sheets

(58) Field of Classification Search
CPC .... H04B 10/50575; H04B 10/58; H04B 1/62; H04L 27/2096; H01S 5/0264; H01S 5/0265; H01S 5/0683
USPC ....... 398/158, 162, 183, 192, 193, 194, 195, 398/196, 197, 198, 182
See application file for complete search history.

(56) References Cited

U.S. PATENT DOCUMENTS

| | | | | |
|---|---|---|---|---|
| 6,178,026 | B1* | 1/2001 | Yoshida | H04B 10/2507 398/161 |
| 6,469,812 | B2* | 10/2002 | McKiel, Jr. | H04J 14/0298 398/9 |
| 6,556,728 | B2* | 4/2003 | Olesen | G02F 1/0123 385/2 |
| 6,570,698 | B2* | 5/2003 | Kim | G02F 1/0123 359/237 |
| 7,155,132 | B2* | 12/2006 | Chiappetta | H04B 10/504 398/193 |
| 7,200,343 | B2* | 4/2007 | Ikeuchi | G02F 1/0123 359/239 |
| 7,925,171 | B2* | 4/2011 | Ooi | H04B 10/505 398/198 |
| 8,050,555 | B2* | 11/2011 | McBrien | G02F 1/225 398/16 |
| 8,320,772 | B2* | 11/2012 | Ooi | H04B 10/505 398/192 |
| 8,503,887 | B2* | 8/2013 | Kikuchi | H04B 10/25137 398/183 |
| 8,531,512 | B2* | 9/2013 | Gono | A61B 1/0638 348/131 |
| 8,798,471 | B2* | 8/2014 | Gaete | H04L 27/2096 398/182 |
| 9,048,954 | B2* | 6/2015 | Rylyakov | H04B 10/2507 |
| 9,354,165 | B2* | 5/2016 | Simpkin | G01N 21/274 |
| 9,564,975 | B2* | 2/2017 | Akiyama | H04J 14/06 |
| 9,819,525 | B2* | 11/2017 | Le Taillandier De Gabory | H04B 10/50575 |
| 2012/0020660 | A1* | 1/2012 | Le Taillandier De Gabory | H04B 10/0775 398/25 |
| 2012/0224866 | A1 | 9/2012 | Gaete et al. | |
| 2012/0288284 | A1* | 11/2012 | Yoshida | H04B 10/5053 398/186 |
| 2013/0265566 | A1* | 10/2013 | Smith | G01J 3/10 356/39 |
| 2014/0140707 | A1* | 5/2014 | Akiyama | H04J 14/06 398/183 |
| 2016/0056889 | A1* | 2/2016 | Le Taillandier De Gabory | H04L 25/14 |
| 2018/0069625 | A1* | 3/2018 | Arikawa | H04B 10/07951 |

* cited by examiner

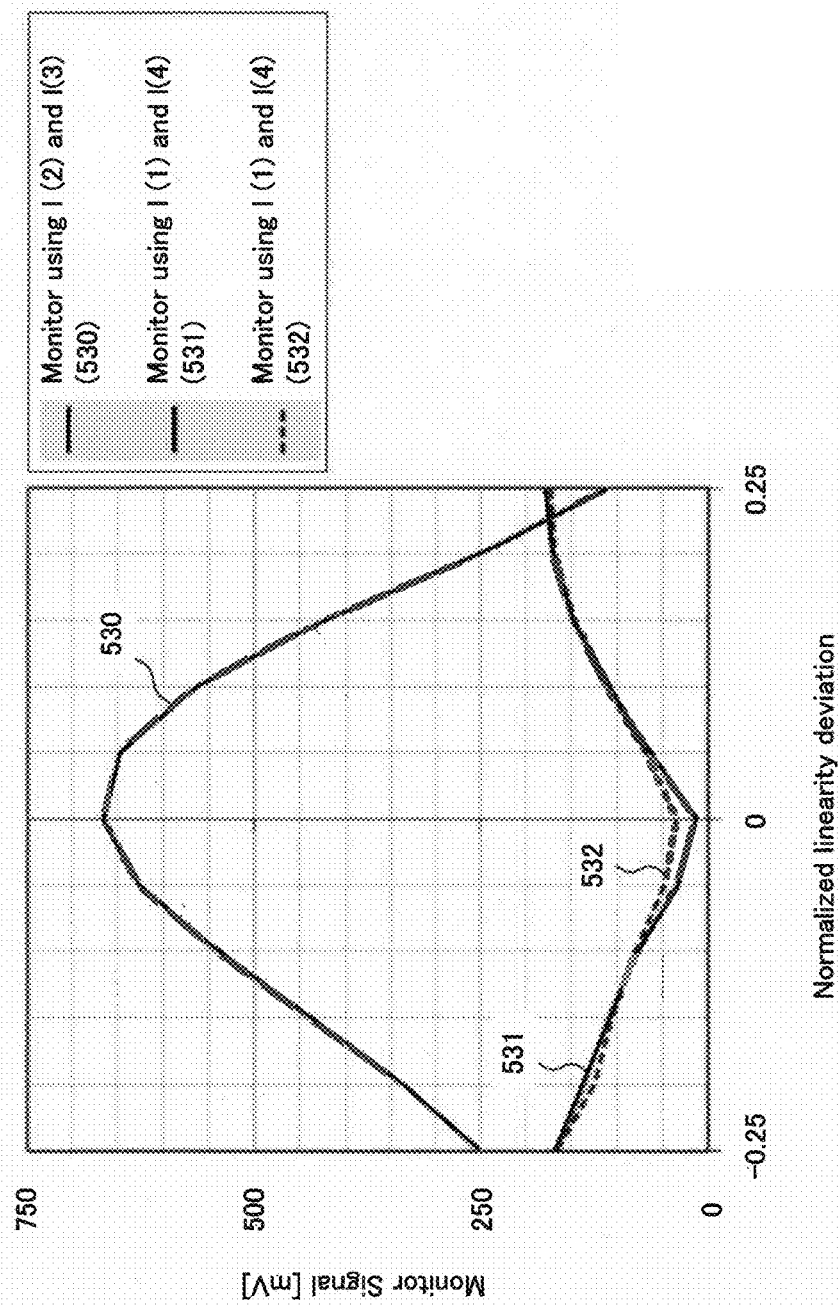

OPTICAL TRANSMITTER AND OPTICAL COMMUNICATION METHOD

This application is a National Stage Entry of PCT/JP2015/001573 filed on Mar. 20, 2015, the contents of all of which are incorporated herein by reference, in their entirety.

TECHNICAL FIELD

The present invention relates to optical transmitters and optical communication methods and, in particular, to an optical transmitter and an optical communication method using digital signal processing techniques.

BACKGROUND ART

Digital Signal Processing (DSP) techniques enable to compensate the impairments affecting optical signals during transmission over a medium such as optical fiber by applying the inverse filter properties of the impairments. This enables higher capacity transmission over an optical fiber or transmission on longer reach of an optical fiber. These techniques can be applied to the received signals inside a receiver and a DSP used to demodulate it.

However, the application of the digital signal processing techniques is not limited to the receiver side; the techniques can also be applied to the transmitter side for additional benefits. In this configuration, DSP is used with Digital to Analog Converters (DACs), which convert the processed digital signals into analog signals with which an optical carrier is modulated. In the following description, we call a digital transmitter a transmitter equipped with DSP and DAC to emit an optical signal according to the information of processed digital signals. In such a manner, DSP of a digital transmitter can be used to pre-compensate at the transmitter side for imperfections of the transmitter hardware and to improve system performance. Digital transmitters also enable the pre-compensation of linear impairments of transmission in the fiber such as chromatic dispersion (CD) and of nonlinear impairments. Depending on source, such compensation can be called pre-compensation, pre-equalization, or pre-distortion.

An example of a transmitter equipped with DSP and DAC is described in patent literature 1 (PTL1). The optical transmission device described in PTL1 has a digital signal processing unit, a D/A converter, a polarization-multiplexing modulation unit, a light-receiving unit, a detect unit, and a correct unit.

The digital signal processing unit acts as a drive signal generate unit for generating a drive signal. The polarization-multiplexing modulation unit modulates an optical signal in accordance with the drive signal. The detect unit detects a fluctuation of a signal component of the drive signal with respect to an optical signal output by the modulation unit. The correct unit corrects a parameter of the drive signal generate unit in accordance with a detect result of the detect unit so that a non-linear characteristic of the modulation unit gets closer to a linear characteristic.

It is said that a non-linear characteristic of the modulator can be compensated according to the optical transmission device described in PTL1.

CITATION LIST

Patent Literature

[PTL 1]
Patent 2014-103594

SUMMARY OF INVENTION

Technical Problem

The related optical transmitter described in PTL1 uses a drive signal F(t) in which a superimposed signal h(t) is superimposed in a reference signal f(t) (F(t)=f(t)+h(t)). The reference signal f(t) is a signal of which frequency fluctuates in accordance with a time. For example, the frequency of the reference signal f(t) fluctuates from f1 to f3, and gets higher as the time passes. On the other hand, data transmitted by an optical transmitter are random and have a constant bit rate but have distributed frequency components. Therefore, the reference signal f(t) cannot be data transmitted by the related optical transmitter.

In consequence, the compensation technique described in PTL1 cannot be used during the service of the related optical transmitter because the reference signal f(t) needs to be emitted, which is not compatible with emission of data for communication. Therefore, the related optical transmitter is limited to use during the calibration of the transmitter and cannot be used to control the linearity of the transmitter during operations. That is to say, the related optical transmitter can compensate non-ideal linearity in the transmitter, but it cannot compensate ulterior changes in non-linearity in the transmitter.

Optical telecom systems, however, are used over long period of time, typically more than ten years in changing environment. These constraints have an influence on the characteristics of the components of a digital transmitter used on the field. The characteristics of the modulator used in a digital transmitter will change over the transmitter lifetime due to changing environmental conditions such as temperature, and due to change in characteristics with ageing. In consequence, the compensation of the linearity in a digital transmitter must also be changed during lifetime in order to maintain optimal characteristics of the transmitter. However, calibration to compensate linearization cannot be performed in service because real data are being transmitted.

As mentioned above, there has been a problem that it is impossible to compensate non-linearity in an optical transmitter during operation.

An exemplary object of the invention is to provide an optical transmitter and an optical communication method, which solve the above-mentioned problem that it is impossible to compensate non-linearity in an optical transmitter during operation.

Solution to Problem

An optical transmitter according to an exemplary aspect of the invention includes a selective addition means for adding a coefficient to digital data to be transmitted if the digital data being included in one of data intervals of predetermined number, the predetermined number being integer more than one, and for changing the coefficient with a period longer than the symbol period of the data transmitted by the optical transmitter; a data processing means for processing the digital data by using a parameter; a driving signal means for generating a driving signal from the digital data adjusted by the selective addition means and the data processing means; a modulating means for modulating light into lightwave signal by the driving signal; and a control means for receiving a monitor signal obtained by monitoring the lightwave signal having a frequency component determined by the period of changing the added coefficients, and for modifying the parameter of the data processing means in order for the monitor signal to reach an extremum.

An optical communication method according to an exemplary aspect of the invention includes (a) adding a coefficient to digital data to be transmitted if the digital data being included in one of data intervals of predetermined number, the predetermined number being integer more than one; (b) changing the coefficient with a period longer than the symbol period of transmitted data; (c) processing the digital data by using a parameter; (d) generating a driving signal from the digital data adjusted by step (a) and step (c); (e) modulating light into lightwave signal by the driving signal; (f) receiving a monitor signal obtained by monitoring the lightwave signal having a frequency component determined by the period of changing the added coefficients; and (g) modifying the parameter of step (c) in order for the monitor signal to reach an extremum.

Advantageous Effects of Invention

An exemplary advantage according to the present invention is that it becomes possible to compensate non-linearity in an optical transmitter during operations.

BRIEF DESCRIPTION OF DRAWINGS

FIG. 5C is a graph illustrating simulation results of monitor signals for different digital processing steps.

DESCRIPTION OF EMBODIMENTS

The exemplary embodiments of the present invention will be described with reference to drawings below.

The First Exemplary Embodiment

Figure 1:
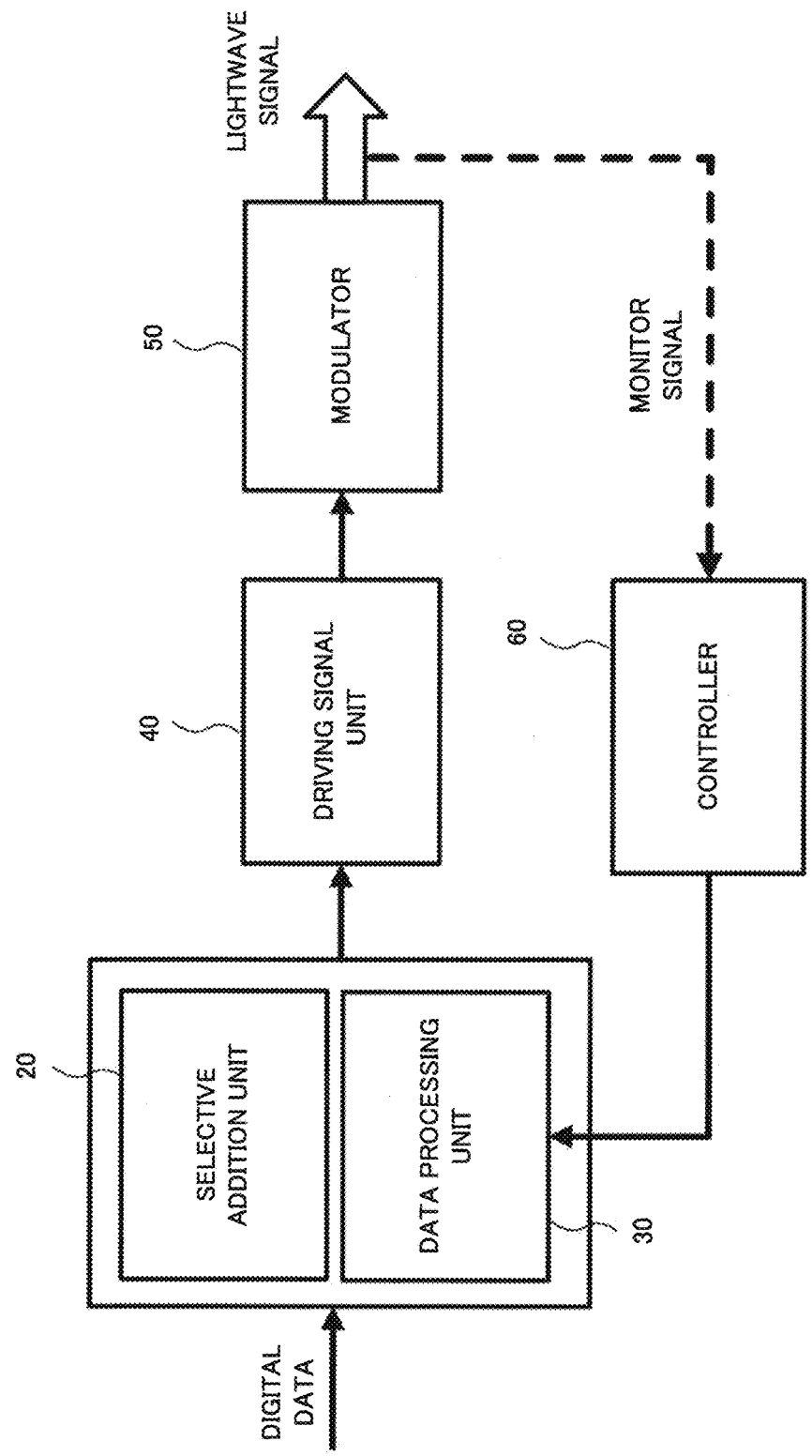
FIG. 1 is a block diagram illustrating the configuration of an optical transmitter in accordance with the first exemplary embodiment of the present invention.

FIG. 1 is a block diagram illustrating the configuration of an optical transmitter in accordance with the first exemplary embodiment of the present invention. The optical transmitter 10 includes a selective addition unit 20 as a selective addition means, a data processing unit 30 as a data processing means, a driving signal unit 40 as a driving signal means, a modulator 50 as a modulating means, and a controller 60 as a control means.

The selective addition unit 20 adds a coefficient to digital data to be transmitted if the digital data are included in one of data intervals of predetermined number, where the predetermined number is integer more than one. The selective addition unit 20 changes the coefficient with a period longer than the symbol period of the data transmitted by the optical transmitter 10.

The data processing unit 30 processes the digital data by using a parameter. The driving signal unit 40 generates a driving signal from the digital data adjusted by the selective addition unit 20 and the data processing unit 30. The modulator 50 modulates light into lightwave signal by the driving signal. And the controller 60 receives a monitor signal obtained by monitoring the lightwave signal having a frequency component determined by the period of changing the added coefficients, and modifies the parameter of the data processing unit 30 in order for the monitor signal to reach an extremum.

The optical transmitter 10 does not require emitting data generated from a special pattern. Therefore, according to the optical transmitter 10 in accordance with the present exemplary embodiment, it becomes possible to compensate non-linearity in the optical transmitter during operations.

The data processing unit 30 can include a coding unit (means), a constant lookup table, and an adjustment unit (means). The coding unit obtains a data value by coding the digital data. The constant lookup table makes a correlation between an input data value inputted into the constant lookup table and an output data value output from the constant lookup table. And the adjustment unit multiplies the input data value and the output data value by multiplying parameter as the parameter.

Alternatively, the data processing unit 30 can include a compensation unit (means) which performs a functional calculation over the digital data using a setting parameter as the parameter.

Next, an optical communication method in accordance with the present exemplary embodiment will be described.

In the optical communication method, a coefficient is added to digital data to be transmitted if the digital data are included in one of data intervals of predetermined number, where the predetermined number is integer more than one. The coefficient is changed with a period longer than the symbol period of transmitted data. The digital data are processed by using a parameter. After that, a driving signal is generated from the digital data adjusted by steps above. Light is modulated into lightwave signal by the driving signal. A monitor signal is received which is obtained by monitoring the lightwave signal having a frequency component determined by the period of changing the added coefficients. And the parameter is modified in order for the monitor signal to reach an extremum.

In step for adding a coefficient, at least one of the data intervals can include a data value obtained by coding the digital data corresponding to the driving signal for average of maximum and of minimum transmission of lightwave in step for modulating light. Alternatively, in step for adding a coefficient, at least one of the data intervals is included between the data value obtained by coding the digital data corresponding to the driving signal for average of maximum and of minimum transmission of lightwave in step for modulating light and the data value obtained by coding the digital data corresponding to the driving signal for maximum transmission of lightwave in step for modulating light.

A first coefficient can be added to the digital data in one data interval, and a second coefficient opposite in sign to the first coefficient is added to the digital data in another data interval.

According to the above-mentioned optical communication method, it becomes possible to compensate non-linearity in an optical transmitter during operations.

The Second Exemplary Embodiment

Figure 2:
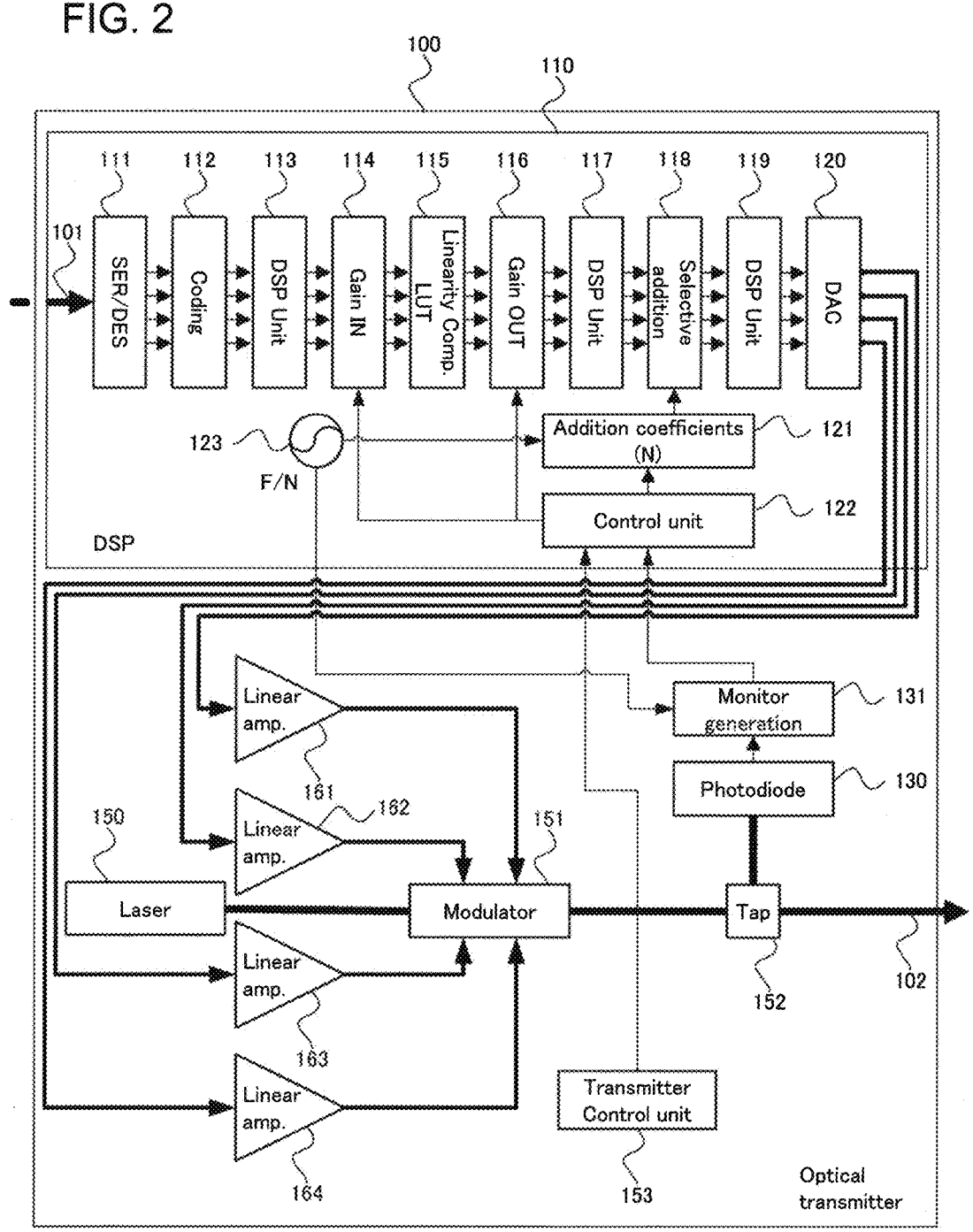
FIG. 2 is a block diagram illustrating the configuration of an optical transmitter in accordance with the second exemplary embodiment of the present invention.

Next, the second exemplary embodiment of the present invention will be described. FIG. 2 is a block diagram illustrating the configuration of an optical transmitter 100 according to the second exemplary embodiment of the present invention.

The optical transmitter 100 emits a lightwave signal 102 which is generated by modulating light emitted from a laser 150 using a modulator 151. The modulation is performed according to a binary data stream 101 which is processed by a DSP (digital signal processor) 110. The binary data stream 101 is a logical representation and it can be composed of several parallel streams. The analog outputs of the DSP 110 are amplified by amplifiers 161, 162, 163, and 164 used as drivers, which generate electrical signals with appropriate amplitudes for the modulator 151.

The modulator 151 and the laser 150 can be integrated. Alternatively, the light emitted by the laser 150 can be directly modulated for the case of direct modulation laser.

The DSP 110 includes a serializer/deserializer 111 generating appropriate data lanes from the binary data stream 101. The optical transmitter 100 is characterized by a dual polarization IQ modulator 151, which is also called a vector modulator or a cartesian modulator depending on sources. The dual polarization IQ modulator 151 modulates lightwave according to four tributaries of XI, XQ, YI, and YQ, where X and Y denote the polarizations and I and Q denote the phase. Accordingly, the serializer/deserializer 111 generates four tributary signals. Each of these tributaries can be composed of parallel lower rate signals.

The output of the serializer/deserializer 111 is coded by a coding unit 112 which performs a feed forward correction (FEC) coding process for different modulation formats including QPSK, 8QAM, and 16QAM, and a framing process as well as an insertion process of training symbols. A DSP unit 113 performs various compensation processes such as nonlinear equalization or linear equalization which includes compensation of the frontend imperfections. The DSP unit 113 also enables to generate spectral shaping such as Nyquist shaping. The output of the DSP unit 113 is sent to an adjustment unit 114.

The adjustment unit 114, for instance, is a multiplication stage which corresponds to a stage adjusting a gain for the signal to be inputted into an LUT unit 115. The LUT unit 115 is used to compensate the imperfection of the linearity of the driving signals which are emitted by the DSP 110 and amplified by the drivers 161, 162, 163, and 164, and the signals which are modulated by the modulator 151. The LUT unit 115 is composed of four distinct LUTs, each of which is applied to a corresponding tributary, that is, one of XI, XQ, YI, and YQ. The output of the LUT unit 115 is adjusted by an adjustment unit 116. The adjustment unit 116, for instance, is a multiplication stage which corresponds to a stage adjusting a gain for the signal output by the LUT unit 115.

A selective addition unit 118 performs selective addition on the output of the adjustment unit 116. The selective addition unit 118 first compares the input digital data with a plurality of intervals. If the data is included in one interval, the selective addition unit 118 adds a coefficient to the input digital data. The coefficients to be added are provided by an addition coefficient unit 121, which stores the coefficient values and updates their values every N symbols, where N is an integer strictly more than one. The synchronization is performed every N symbols by a low frequency clock unit 123, which generates synchronization signal related to the frequency F/N, where F is the symbol rate of the optical transmitter 100. The operation of the addition coefficient unit 121 is controlled by a DSP control unit 122. The DSP control unit 122 also controls gain values of the adjustment units 114, 116, which provide individual adjustment values for each of the four tributaries of the DSP 110.

In one implementation, the coefficients for the selective addition, which is performed by the selective addition unit 118, vary among the four tributaries of the DSP 110. The addition coefficient unit 121, therefore, provides four sets of coefficients for the selective addition unit 118.

The coefficients related to the tributary XI are updated every N(XI) symbols. The coefficients related to the tributaries XQ, YI, and YQ are updated every N(XQ), N(YI), and N(YQ) symbols respectively. Each of the integers N(XI), N(XQ), N(YI), and N(YQ) is strictly more than one. The low frequency clock unit 123 provides four synchronization signals at the frequencies of F/N(XI), F/N(XQ), F/N(YI), and F/N(YQ). Alternatively, the low frequency clock unit 123 provides a frequency F/N and the frequencies of F/N(XI), F/N(XQ), F/N(YI), and F/N(YQ) are generated from F/N by means of frequency conversion. In one implementation, the integers of N(XI), N(XQ), N(YI), and N(YQ) are different. In another implementation, some or all of them can be equal.

The output of the selective addition unit 118 is processed by a DSP unit 119. The DSP unit 119 can be bypassed, and it can include a clipping processing or a gain adjustment processing. The output of the DSP unit 119 is provided for a digital to analog converter (DAC) 120, which is composed of four DACs generating analog signals from the digital data to be processed by the DSP 110.

The four analog output signals generated by the DAC 120 in the DSP 110 are amplified by the drivers 161, 162, 163, and 164. They are linear amplifiers with high voltage outputs. However, since the linearity of the amplifiers is imperfect, the LUT unit 115 is used to pre-compensate the linearity of the driving signals which are used to modulate the light output from the laser 150 into the lightwave signal 102. The LUT unit 115 also compensates the distortion of the linearity caused by the DAC unit 120, its output buffers, and the modulator 151.

The lightwave signal modulated by the modulator 151 is tapped by a tap unit 152, which can be implemented as a coupler. The lightwave with highest power output from the tap unit 152 is used to emit the lightwave signal 102 and the tapped portion of the lightwave with the lowest power is provided for a photodiode 130. A monitor generation circuit 131 performs processes for converting intensity into voltage, filtering and amplifying the output of the photodiode 130, and generates a monitor signal related to the frequency F/N.

The tap unit 152 and the photodiode 130 can be integrated in the modulator 151. Alternatively, the tap unit 152, the photodiode 130, and the monitor generation circuit 131 can be disposed outside the optical transmitter 100 to generate a monitor signal from the lightwave signal output by the modulator 151. In this case, the output of the monitor generation circuit 131 is provided for the DSP control unit 122 inside the DSP 110 in the optical transmitter 100.

Figure 3A:
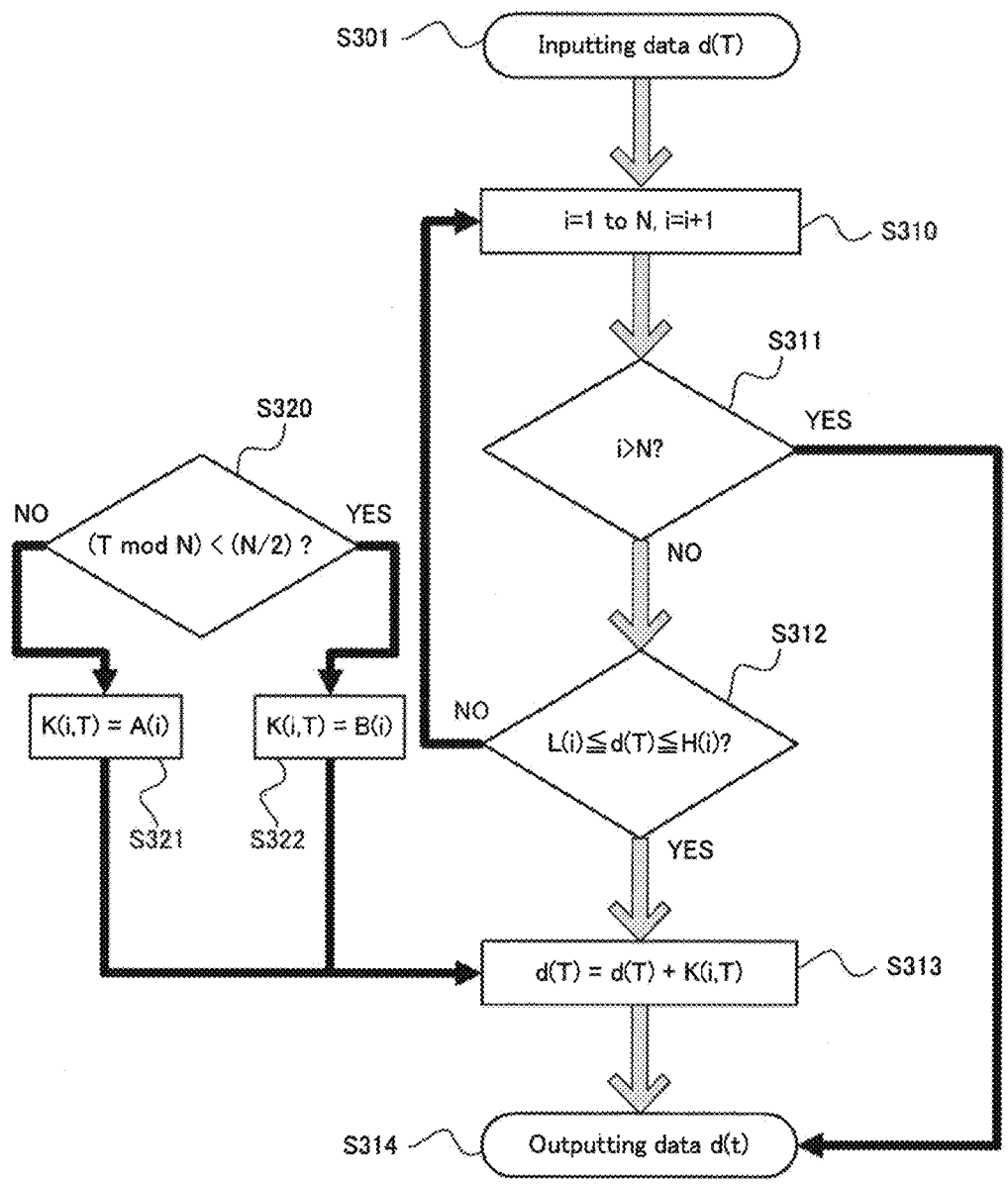
FIG. 3A is a flowchart illustrating the operation of the selective addition unit included in the optical transmitter in accordance with the second exemplary embodiment of the present invention.

FIG. 3A is a flowchart illustrating the operation of the selective addition unit 118 shown in FIG. 2.

The data inputted into the selective addition unit 118 is represented by d and is indexed by the numeral T which denotes consecutive indices.

In step S301, d(T) is inputted into the selective addition unit 118. In step S310, a loop is initiated with the index i to the value of N. The loop index is used to mark the number of intervals in the selective addition unit 118. There are N intervals denoted from I(1) to I(N) with respective lower bounds denoted from L(1) to L(N) and respective higher bounds denoted from H(1) to H(N). The values H(i) and L(i) are provided for the selective addition unit 118 by the addition coefficient unit 121.

In step S311, the selective addition unit 118 checks if the loop on the intervals has been finished. If the loop continues (S311/NO), the selective addition unit 118 checks if the data d(T) is located inside the interval I(i), that is, between the bounds L(i) and H(i) (S312). If the data is located outside the interval I(i) (S312/NO), the index i is incremented by one and the selective addition unit 118 checks again the finishing condition of the loop on interval (S311).

In step S312, if the data d(T) is located inside the interval I(i) (S312/YES), the selective addition unit 118 adds the value K(i,T) to the data d(T) (S313). The value K(i,T) is defined for each interval and depends on the time index T. More specifically, the time index T modulo N is compared with N/2 in step S320. Depending on the results of step S320, the value K(i,T) takes the value A(i) defined for each interval I(i) at step S321 or it takes the value B(i) defined for each interval I(i) at step S322. The numeral N is given as reference from the low frequency clock unit 123 shown in FIG. 1. The values A(i) and B(i) are provided for the selective addition unit 118 by the addition coefficient unit 121. By steps S320, S321, and S322, the value K(i) is changed with a period of N symbols. In the result, a frequency component of F/N is generated, where F is the symbol rate of signal generated according to data d. Finally, the selective addition unit 118 outputs the data (S314).

Therefore, if the data d(T) is located inside any one of the defined intervals, a value, which is changed with periodicity N, is added to the data d(T). Otherwise, the data d(T) is not changed by the selective addition unit 118. Contrary to well-known dither which is applied to the data d or to bias voltages of the modulator 151, the selective addition by the selective addition unit 118 enables to imprint low frequency component (F/N) on the data for designated intervals only. In this manner, it is possible to control the phase contribution to each data d(T) of the monitor signal generated by the monitor generation circuit 131. This would be impossible for dither because d(T) is susceptible to taking any value and would result in an arbitrary voltage value being inputted into the modulator 151, contributing to the frequency component generated by the monitor generation circuit 131 with an arbitrary phase component. In this manner, the selective addition unit 118 enables to generate meaningful monitor signals through the monitor generation circuit 131.

The selective addition operation does not depend on the modulation format or the pre-equalization which is applied to the digital data. This is due to the fact that the selective addition is applied to specific ranges of data without depending on the data distribution probability.

Figure 3B:
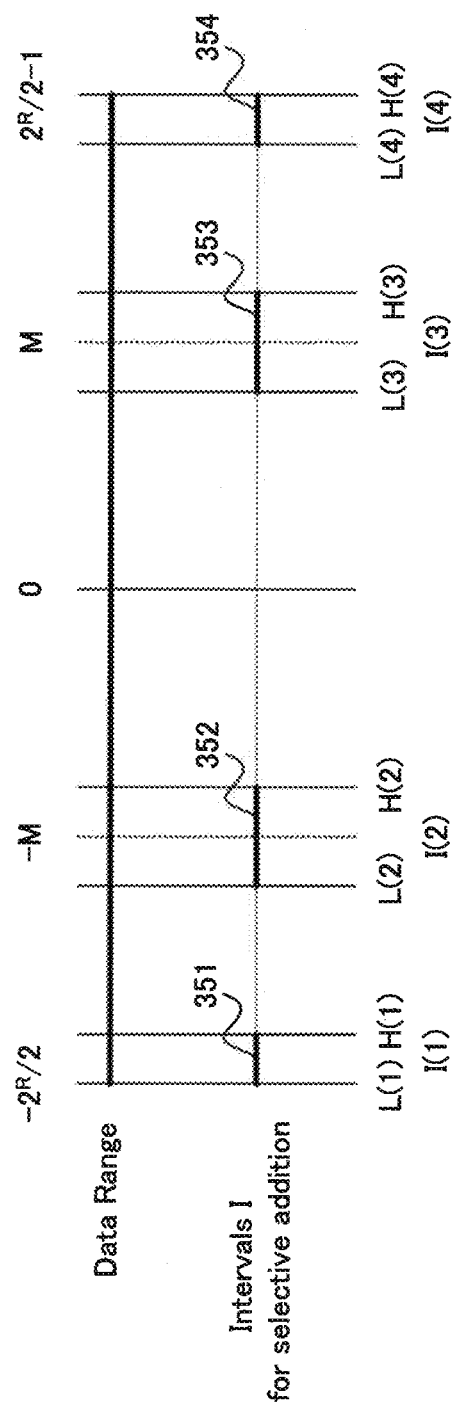
FIG. 3B is a schematic view to illustrate the conditions of digital data according to the process described by using FIG. 3A.

FIG. 3B is a schematic view to illustrate the conditions of digital data according to the process described by using FIG. 3A.

The data d ranges from $-2^R$ to $2^R-1$, where R is the number of bits which code data d. The number of intervals I(i) is set at four and the intervals are denoted by the numerals of 351, 352, 353, and 354. The interval I(1) denoted by 351 ranges from $L(1)=-2^R$ to H(1). The interval I(2) denoted by 352 ranges from L(2) to H(2) and contains the data value −M. The interval I(3) denoted by 353 ranges from L(3) to H(3) and contains the data value M. The interval I(4) denoted by 354 ranges from L(4) to $H(4)=2^R-1$. These intervals are distinct from each other.

The value H(1) is chosen so that the negative data value, which codes one point of the maximum transmission of the modulator 151, may be included in I(1). The value L(4) is chosen so that the positive data value, which codes another point of the maximum transmission of the modulator 151, may be included in I(4). The points of maximum transmission of the modulator 151 are obtained for voltages of 0 or 2×Vpi, modulo 2×Vpi, which are applied to the modulator 151 as DC biases. Vpi represents the voltage difference between the maximum transmission and the minimum transmission in the modulator 151. The data value M is coded for the voltage corresponding to Vpi/2.

Figure 4:
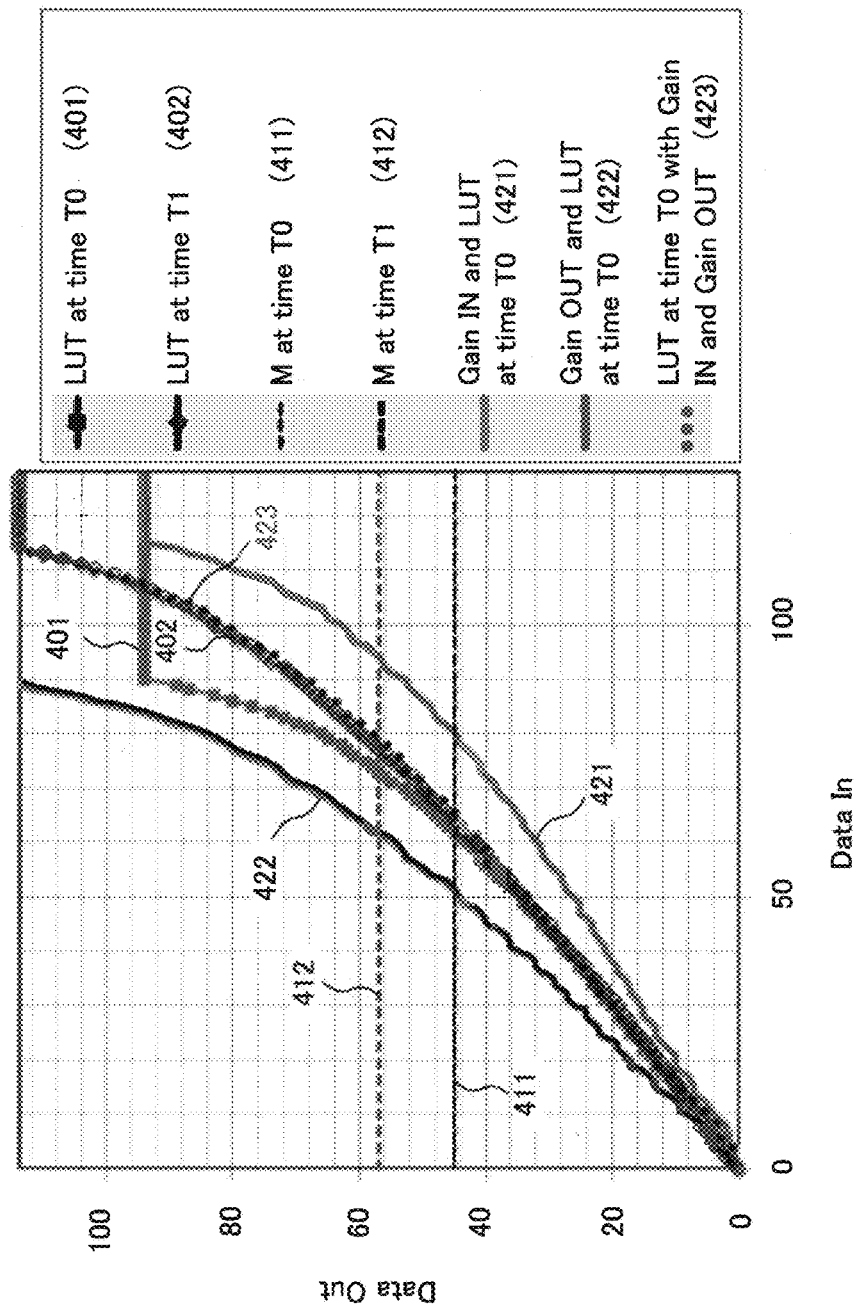
FIG. 4 is a graph representing lookup tables in the LUT unit included in the optical transmitter in accordance with the second exemplary embodiment of the present invention.

FIG. 4 is a graph representing lookup tables used for compensating the linearity by the LUT unit 115 using the adjustment units 114, 116. FIG. 4 shows five curves denoted by the numerals of 401, 402, 421, 422, and 423, and two lines 411 and 412. These graphs plot output data against input data on positive ranges. The LUT is plotted on the positive range which is used for the XI tributary in the optical transmitter 100 shown in FIG. 2 by the LUT unit 115. Notably, the graph is limited to the positive range for visibility only and the LUT in the negative range is symmetrical to that with the origin point (0, 0) as a symmetric center. The data are coded on 8 bits, therefore they range between −128 and 127 (R=8 from the definition in FIG. 3B).

At a time T0, the LUT of the LUT unit 115 compensates the imperfection of linearity and is plotted by the curve 401. After a long period of time, five years for instance, ageing degradation and variations in conditions of the operation cause changes in the characteristics of the amplifiers 161, 162, 163, and 164 as well as the DAC 120 and the modulator 151. The ideal LUT to compensate the linearity is plotted by curve 402. However, the LUT plots represented by curve 401 were calibrated when producing the optical transmitter 100, but the LUT corresponding to curve 402 was not able to be anticipated when producing it nor recalibrated during the service of the optical transmitter 100. Therefore, it causes degradation of the emitted signal quality to operate the optical transmitter 100 using constant LUT plots by curve 401.

According to the optical transmitter 100 in accordance with the present exemplary embodiment, first, the output of the LUT unit 115 is plotted by curve 421 when the adjustment unit 114 is controlled by the DSP control unit 122. Similarly, the output of the adjustment unit 116 is plotted by curve 422 when the adjustment unit 116 is controlled by the DSP control unit 122 and the adjustment unit 114 is not used. The curves 421 and 422 enable to surround the searched LUT plots on curve 402 but do not enable to reach it.

Finally, the output of the adjustment unit 116 is plotted by curve 423 when the adjustment units 114 and 116 are controlled by the DSP control unit 122. In this case, using constant LUT, that is, the LUT which was calibrated at production of the optical transmitter 100 and which was able to be used at time T0, with the adjustment units 114 and 116 controlled by the DSP control unit 122 enables to reach the ideal LUT plots at time T1 without needing recalibration of the optical transmitter 100. Therefore, it becomes possible to compensate imperfection of linearity during lifetime of the optical transmitter and in service. Multiplying inverse adjustment values enables in the same manner to generate a LUT appropriate for the conditions at T0 from a calibrated LUT at T1. Therefore, it is possible to compensate the changes in linearity for any evolution of linearity.

In FIG. 4, the line 411 denotes the value corresponding to point M in FIG. 3B under the condition at time T0 and the line 412 denotes the value corresponding to point M at time T1. The values L(i) and H(i) provided by the addition coefficient unit 121 for the selective addition unit 118 are updated by the DSP control unit 122 using gain values used for adjustment units 114 and 116.

FIGS. 5A, 5B, 5C, and 5D summarize simulation results of the monitor signals according to the present exemplary embodiment.

Figure 5A:
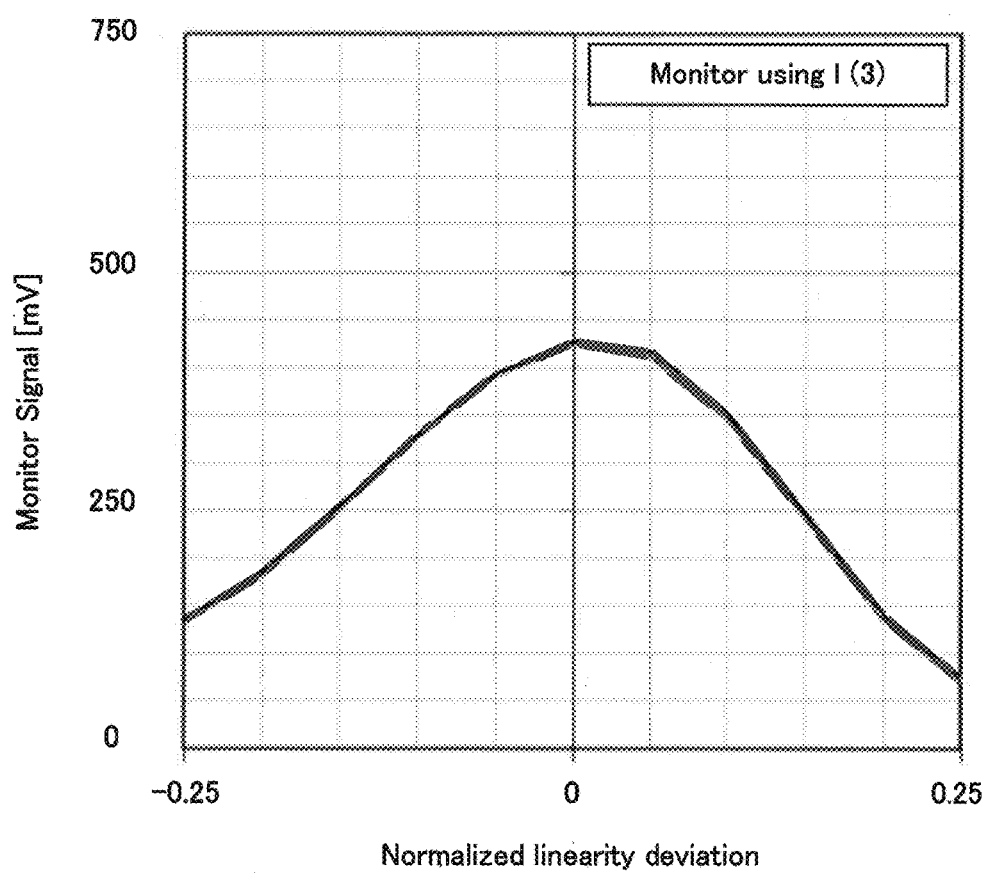
FIG. 5A is a graph illustrating simulation results of a monitor signal with maximum control.

FIG. 5A represents simulation results of a monitor signal with maximum control. The curve shown in FIG. 5A represents the simulated monitor signal generated by the monitor generation circuit 131 and is plotted against the maximum linearity deviation which is normalized over the data range.

In this simulation, the lightwave signal 102 emitted by the optical transmitter 100 is 32 Gbaud PM (polarization multiplexed)–16QAM. The DSP unit 113 performs compensation for bandwidth limitation of the DAC 120 and the amplifiers 161 to 164 having effective bandwidth of 12 GHz. The numeral N is set at 1000, which sets the frequency components F/N at 32 MHz. Higher-order N enables to reach lower frequency components in the kilohertz range. According to the definitions of FIG. 3B, the data resolution is 8 bit with data ranging from −128 to 127.

The selective addition unit 118 uses the interval I(3) in which data values range from 54 to 60, the center of the data range is located around M=57, and constants provided by the addition coefficient unit 121 are set at A=3 and B=−3. The monitor signal reaches its maximum at zero deviation, that is, for the optimal compensation of linearity and diminishes with the increase in the deviation of the linearity. Therefore, controlling the adjusting units 114 and 116 by the DSP control unit 122 enables to maintain optimal compensation of nonlinearity over time by maximizing the monitored signal.

Figure 5B:
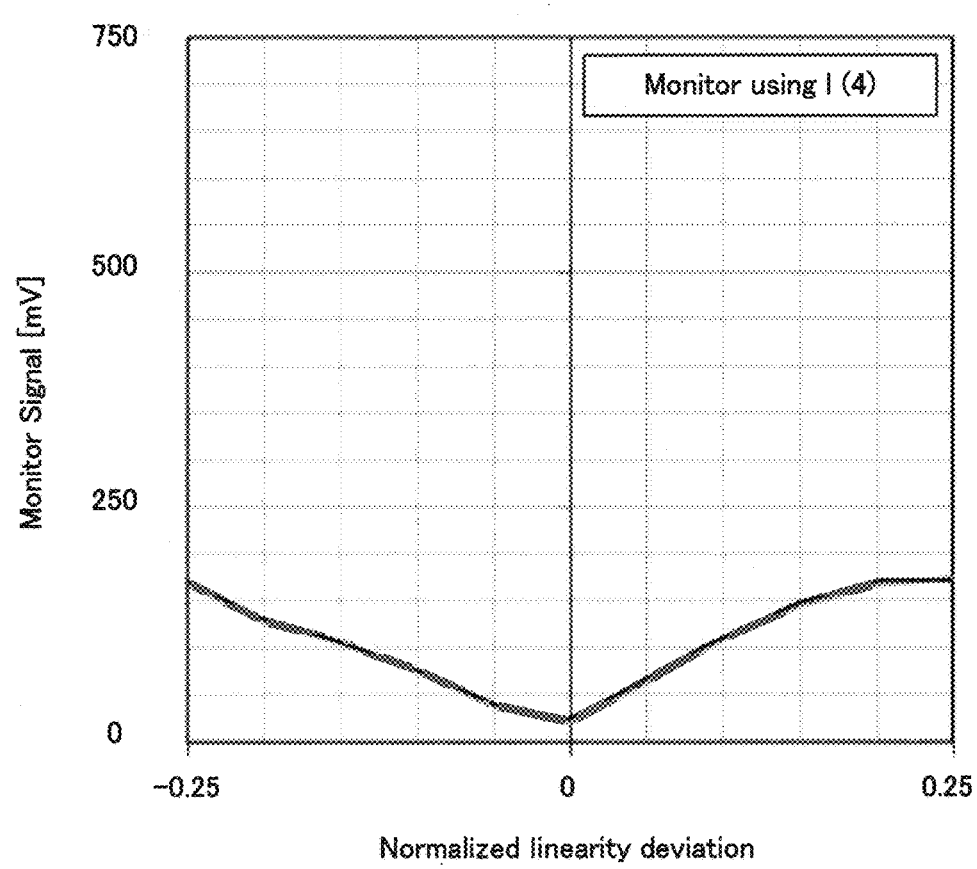
FIG. 5B is a graph illustrating simulation results of a monitor signal with minimum control.

FIG. 5B represents simulation results of a monitor signal with minimum control. The curve shown in FIG. 5B represents the simulated monitor signal generated by the monitor generation circuit 131 and is plotted against the maximum linearity deviation which is normalized over the data range. The signal conditions are identical with those used for the case shown in FIG. 5A.

The selective addition unit 118 uses the interval I(4) in which data values range from 121 to 127 and constants provided by the addition coefficient unit 121 are set at A=3 and B=−3. The monitor signal reaches its minimum at zero deviation, that is, for the optimal compensation of linearity and diminishes with the decrease in the deviation of the linearity. Therefore, controlling the adjusting units 114 and 116 by the DSP control unit 122 enables to maintain optimal compensation of nonlinearity over time by minimizing the monitored signal.

FIG. 5C represents simulation results of a monitor signals with different controls and different processing steps. The signal conditions are identical with those used for the case shown in FIG. 5A.

The curves 530, 531, and 532 shown in FIG. 5C represent the simulated monitor signals generated by the monitor generation circuit 131 and are plotted against the maximum linearity deviation which is normalized over the data range.

For the curve 530, the selective addition unit 118 uses the interval I(2) and I(3) in which data values range from −60 to −54 and from 54 to 60, respectively and respective constants provided by the addition coefficient unit 121 are set at A(2)=−3, B(2)=3 and A(3)=3, B(3)=−3. Therefore, the low frequency component imprinted on data in I(2) has the opposite phase to that imprinted on data in I(3). This phase relation could not be achievable with traditional dither imprinting, for which phase relation would be uniform on all the data range. The monitor signal reaches its maximum at zero deviation, that is, for the optimal compensation of linearity and diminishes with the increase in the deviation of the linearity. Therefore, controlling the adjusting units 114 and 116 by the DSP control unit 122 enables to maintain optimal compensation of nonlinearity over time by maximizing the monitored signal. Furthermore, using two intervals of I(2) and I(3) enables to get monitor signal with higher dynamic range compared with the curve shown in FIG. 5A.

For the curve 531, the selective addition unit 118 uses the interval I(1) and I(4) in which data values range from −128 to −122 and from 121 to 127, respectively and respective constants provided by the addition coefficient unit 121 are set at A(1)=−3, B(1)=3 and A(4)=3, B(4)=−3. Therefore, the low frequency component imprinted on data in I(1) has the opposite phase to that imprinted on data in I(4). The monitor signal reaches its minimum at zero deviation, that is, for the optimal compensation of linearity and diminishes with the decrease in the deviation of the linearity. Therefore, controlling the adjusting units 114 and 116 by the DSP control unit 122 enables to maintain optimal compensation of nonlinearity over time by minimizing the monitored signal. Furthermore, using two intervals of I(1) and I(4) enables to get monitor signal with higher dynamic range compared with the curve shown in FIG. 5B.

For the curve 532, the selective addition unit 118 uses identical intervals I(1) and I(4). Their respective constants provided by the addition coefficient unit 121 are set at A(1)=A(4)=3 and B(1)=B(4)=−3. The monitor signal reaches its minimum at zero deviation, that is, for the optimal compensation of linearity and diminishes with the decrease in the deviation of the linearity. Therefore, controlling the adjusting units 114 and 116 by the DSP control unit 122 enables to maintain optimal compensation of nonlinearity over time by minimizing the monitored signal.

Figure 5D:
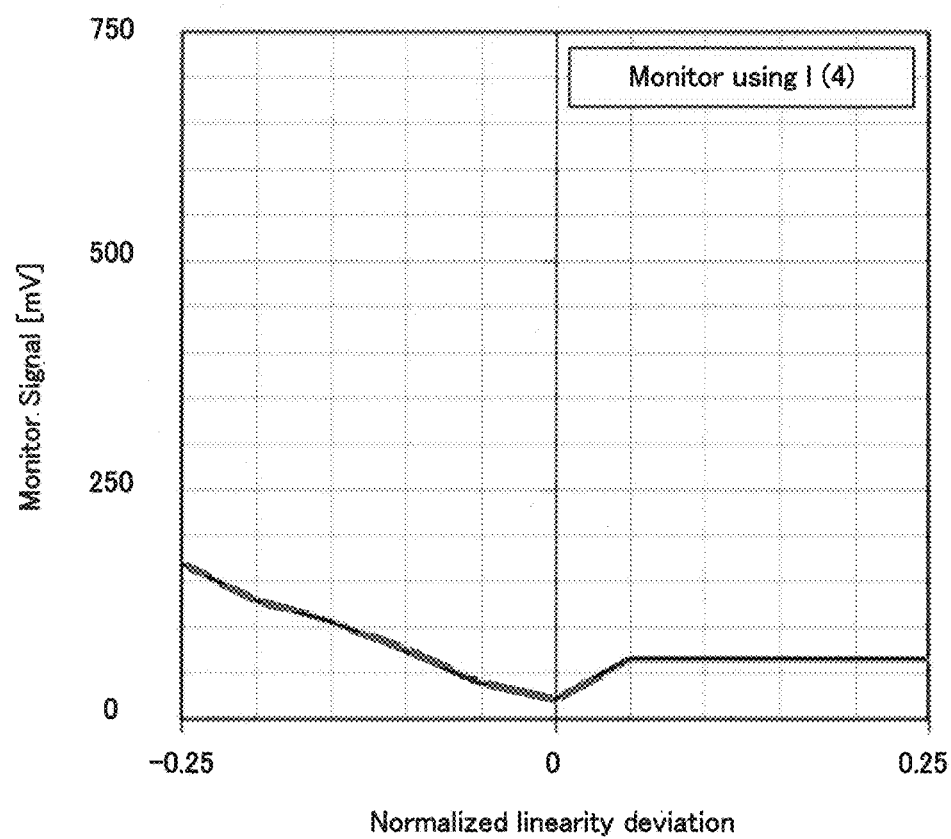
FIG. 5D is a graph illustrating simulation results of monitor signals with minimum control.

FIG. 5D represents simulation results of a monitor signal with minimum control. The curve shown in FIG. 5D represents the simulated monitor signal generated by the monitor generation circuit 131 and is plotted against the maximum linearity deviation which is normalized over the data range. The signal conditions are identical with those used for the case shown in FIG. 5A. The selective addition unit 118 uses the interval I(4) in which data values range from 111 to 118 and constants provided by the addition coefficient unit 121 are set at A=3 and B=3. The monitor signal reaches its minimum at zero deviation, that is, for the optimal compensation of linearity and diminishes with the decrease in the deviation of the linearity. Therefore, controlling the adjusting units 114 and 116 by the DSP control unit 122 enables to maintain optimal compensation of nonlinearity over time by minimizing the monitored signal.

Furthermore, clipping process is applied to the data used by the LUT unit 115. Using the maximum data value for which the monitor signal increases enables to set the clipping value of LUT unit 115. In this case, it is set in the addition coefficient unit 121. Using the monitor signal provided by the monitor generation circuit 131 enables to set the maximum clipping value. Similarly, using the interval I(1) enables to set the minimum clipping value.

As mentioned above, according to the present exemplary embodiment, it becomes possible to compensate non-linearity in an optical transmitter during operations.

The present exemplary embodiment can be implemented with low additional resource and with little footprint and enables low cost and small size design. According to the present exemplary embodiment, it becomes possible to generate within DSP lower frequency component used for control, and therefore to make a better connection with DSP internal monitors. It becomes easy to control the adjustment process through digital implementation.

According to the present exemplary embodiment, it becomes possible to emit optimal signal in regard to linearity of the driving signals. Therefore it is possible to achieve the transmission and reception of high quality signal over longer distance by a digital transmitter on wide and re-configurable conditions of modulation format and signal processing at the transmitter.

The Third Exemplary Embodiment

Figure 6:
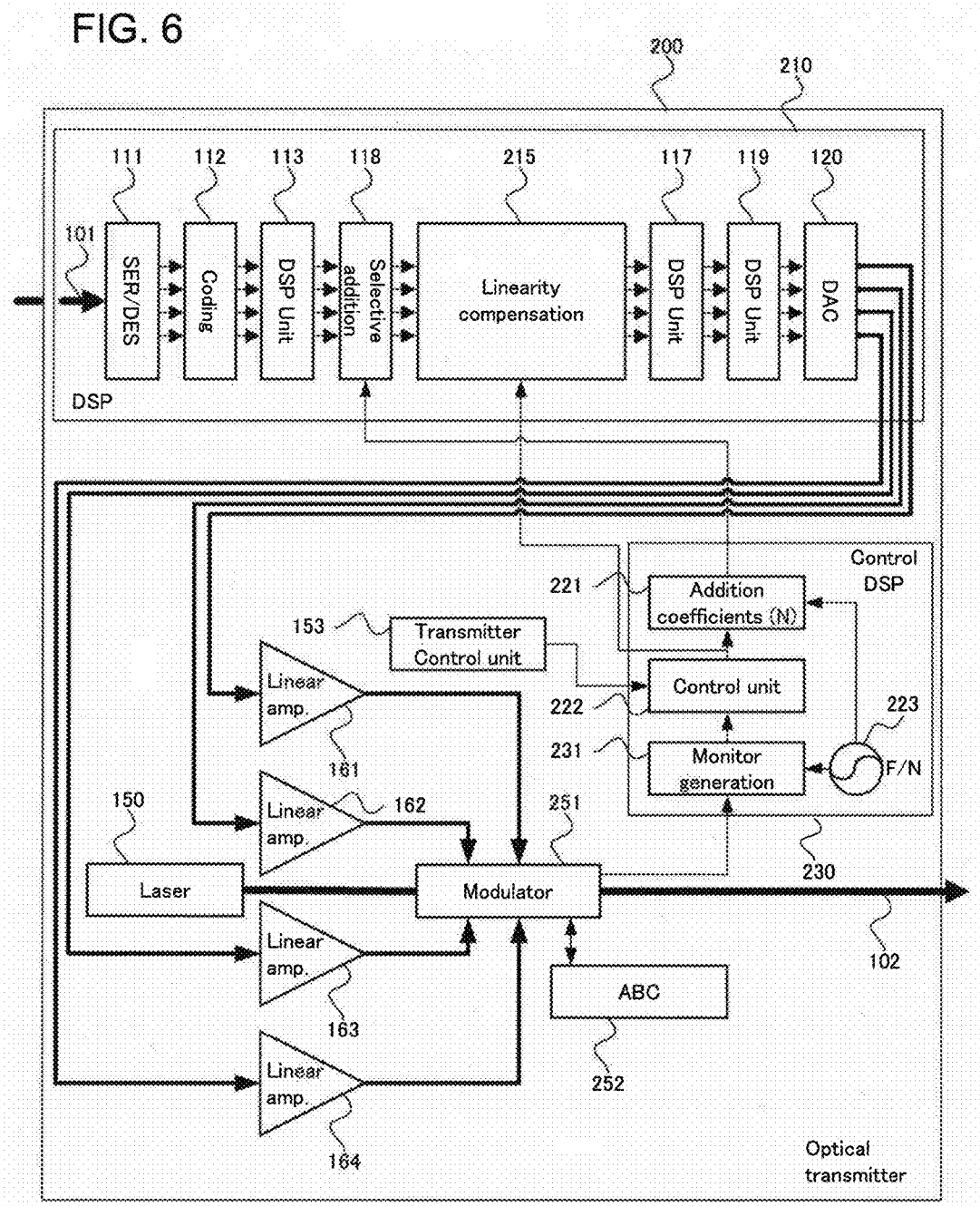
FIG. 6 is a block diagram illustrating the configuration of an optical transmitter in accordance with the third exemplary embodiment of the present invention.

Next, the third exemplary embodiment of the present invention will be described. FIG. 6 is a block diagram illustrating the configuration of an optical transmitter 200 according to the third exemplary embodiment of the present invention.

The optical transmitter 200 emits the lightwave signal 102 according to the binary data stream 101 similarly to the optical transmitter 100 shown in FIG. 2. The optical transmitter 200 includes a laser 150, drivers 161, 162, 163, and 164, and a transmitter control unit 153, which are described in FIG. 2. The light emitted by the laser 150 is modulated by a modulator 251, which includes tap means similar to the tap unit 152, and a monitor photodiode similar to the photodiode 130 shown in FIG. 2.

The binary data stream 101 is processed by a DSP 210, which generates four analog signals fed to the drivers denoted by the numerals from 161 to 164. The DSP 210 includes the serializer/deserializer 111, the coding unit 112, DSP units 113, 117, and 119, the selective addition unit 118, and DAC 120, which have been described in FIG. 2. The DSP unit 210 also includes a linearity compensation unit 215, which compensates the imperfection of linearity of the driving signals which are generated by the imperfect DAC 120 and amplified by the drivers denoted by the numerals from 161 to 164, and the signals which are modulated by the modulator 251. The biases of the modulator 251 are controlled by an automatic bias control (ABC) circuit 252 based on monitoring values provided by integrated photodiode (PD) in the modulator 251.

The optical transmitter 200 also includes a low speed control DSP 230, which controls the setting of the DSP 210 and other part of the optical transmitter 200. The low speed control DSP 230 includes a monitor generation unit 231 which digitally generates a monitor signal according to the monitor photodiode integrated in the modulator 251. The monitor generation unit 231 filters inputted signals in spectral region around the frequency F/N, whose reference is given by a low frequency clock unit 223. A control unit 222 included in the low speed control DSP 230 controls the parameters of the linearity compensation unit 215 included in the DSP 210 according to the monitor signals generated by the monitor generation unit 231. The control unit 222 also controls an addition coefficient unit 221 which provides coefficients to be added to digital data by the selective addition unit 118 in the DSP 210, as is the case with the addition coefficient unit 121 shown in FIG. 2. The transmitter control unit 153 also controls the control unit 222. Alternatively, the transmitter control unit 153 can be integrated in the low speed control DSP unit 230.

In an implementation of the present exemplary embodiment, the linearity compensation unit 215 operates arcsine calculation with series approximation over the digital data to compensate the imperfection of the linearity according to the following relation:

$$d_{out} = K_2 \times \arcsin(K_1 \times d_{in})$$

in which $d_{out}$ represents the digital data output by the linearity compensation unit 215, $d_{in}$ represents the digital data inputted into the linearity compensation unit 215, and $K_1$ and $K_2$ are setting parameters of the linearity compensation unit 215.

Alternatively, the linearity compensation unit 215 includes LUTs for the four tributaries of the DSP 210, which is used to compensate the imperfection of the linearity. The LUTs used in the linearity compensation unit 215 are calculated by multiplying the input data by a first coefficient $K_{input}$ then passing through an LUT $L_o$ and multiplying the result by a second coefficient $K_{output}$. The multiplying coefficients and the original LUT $L_0$ are stored in the control unit 222. The resulting operation of the two multiplications and the lookup table is calculated in a new LUT, which is stored into the linearity compensation unit 215 by the control unit 222. In this manner, the linearity compensation unit 215 operates with the LUT, which is re-actualized by the control unit 222.

The Fourth Exemplary Embodiment

Figure 7:
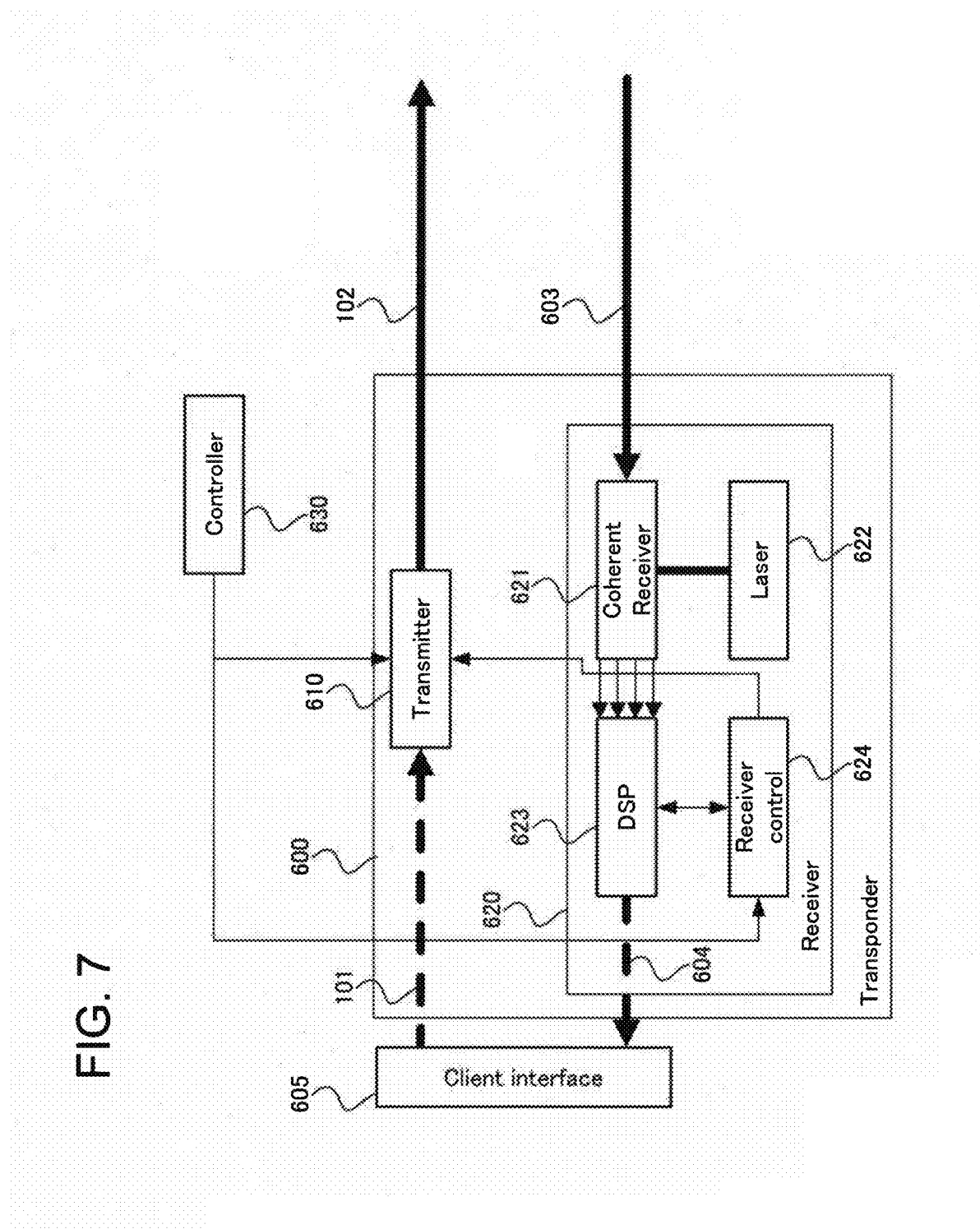
FIG. 7 is a block diagram illustrating the configuration of an optical transponder in accordance with the fourth exemplary embodiment of the present invention.

Next, the fourth exemplary embodiment of the present invention will be described. FIG. 7 is a block diagram illustrating the configuration of a transponder in accordance with the fourth exemplary embodiment of the present invention.

The transponder 600 includes a transmitter 610 and a receiver 620. The transmitter 610 is identical to the optical transmitter 100 shown in FIG. 2. Alternatively, the transmitter 610 can be identical with the optical transmitter 200 shown in FIG. 6.

The transmitter 610 is fed the binary data stream 101 and emits the lightwave signal 102 accordingly. The binary data stream 101 and the lightwave signal 102 are identical with those described in FIG. 2.

The receiver 620 receives a lightwave signal 603 and generates a data stream 604 accordingly. The binary data stream 101 comes from a client interface 605, which is fed with the data stream 604. The lightwave signal 102 is received by another transponder identical with the transponder 600 at the other end of a fiber medium through which the lightwave signal 102 is transmitted. The lightwave signal 603 is emitted by another transponder identical with the transponder 600 at the other end of the fiber medium through which the lightwave signal 603 is transmitted.

The receiver 620 includes a coherent receiver 621, which mixes the received signal with the light emitted by a laser 622 used as a local oscillator, generates beat signals by means of four integrated balanced photodiodes, and amplifies the output of the photodiodes. The four tributaries output by the coherent receiver 621 are fed into a receiver DSP 623, which compensates distortions impairing the lightwave signal 603 during transmission, demodulates the received signal, and performs FEC and decoding. The receiver DSP 623 is controlled by a receiver control unit 624. A controller 630 controls the setting of the transmitter 610 through the transmitter control unit 153, and the setting of the receiver 620 through the receiver control unit 624.

Next, examples of the operation of the transponder 600 will be explained.

The transmitter 610 is identical with the optical transmitter 100 shown in FIG. 2. The adjustment units 114 and 116 are controlled by the DSP control unit 122 in order to maximize the monitor signal generated by the monitor generation circuit 131 according to the conditions of the curve 530 shown in FIG. 5C. Specifically, the DSP control unit 122 controls the value of the adjustment unit 114 to maximize the value of the monitor signal. The value of the adjustment unit is calculated by the DSP control unit 122 so that the product of the parameters of the adjustment units 114, 116 may be constant. In this manner, the compensation of the imperfection of the linearity is maintained optimal during the operation of the transmitter 600 despite variations due to ageing and changes in operation conditions.

Alternatively, the DSP control unit 122 controls the value of the adjustment unit 116 to maximize the value of the monitor signal. The value of the adjustment unit is calculated by the DSP control unit 122 so that the product of the parameters of the adjustment units 114, 116 may be constant.

Alternatively, the DSP control unit 122 controls the value of the adjustment unit 114 to maximize the value of the monitor signal. The value of the adjustment unit 116 is adjusted by the DSP control unit 122 so that the value output by the adjustment unit 116 may be equal to the corresponding maximum non-clipped value of the data inputted into the adjustment unit 114.

Alternatively, the adjustment units 114, 116 are controlled by the DSP control unit 122 in order to maximize the monitor signal generated by the monitor generation circuit 131 according to the conditions of the curves 530 and 531 shown in FIG. 5C. In this configuration the selective addition unit 118 performs addition over four segments from I(1) to I(4). In a first time slot, the selective addition unit 118 uses the segments I(1) and I(4), and the DSP control unit 122 controls the adjustment unit 114 in order to minimize the monitor plot on curve 531. In a second time slot, the selective addition unit 118 uses the segments I(2) and I(3), and the DSP control unit 122 controls the adjustment unit 116 in order to maximize the monitor plot on curve 530. The DSP control unit 122 sequentially repeats the succession of the first time slot and the second time slot. The compensation of the imperfection of the linearity is maintained optimal during the operation of the transmitter 610 despite variations due to ageing and changes in operation conditions.

Alternatively, the selective addition unit 118 uses the segments I(1) and I(4) associated with the integer N(1) for step S320 shown in FIG. 3A. The DSP control unit 122 controls the adjustment unit 114 in order to minimize the monitor plot on curve 531. In the same time, the selective addition unit 118 uses the segments I(2) and I(3) with the integer N(2) for step S320 shown in FIG. 3A, and the DSP control unit 122 controls the adjustment unit 116 in order to maximize the monitor plot on curve 530. The DSP control unit 122 simultaneously performs maximization of the monitor plot with the curve 530 and minimization of the monitor signal plot with the curve 531, taking advantage of the fact that the two monitor signals are generated in respective independent spectral regions around respective values F/N(2) and F/N(1). The compensation of the imperfection of the linearity is maintained optimal during the operation of the transmitter 610 despite variations due to ageing and changes in operation conditions.

Alternatively, the coefficients of the four tributaries of the DSP 110, which are used for the selective addition performed in the selective addition unit 118, are distinct from each other. The addition coefficient unit 121, therefore, provides four sets of coefficients for the selective addition unit 118. The coefficients related to the tributary XI are updated every N(XI) symbols, those related to the respective tributaries XQ, YI, and YQ are updated every respective N(XQ), N(YI), and N(YQ) symbols. The integers N(XI), N(XQ), N(YI), and N(YQ) are distinct from each other and strictly more than one. The low frequency clock unit 123 provides four synchronization signals at the frequencies F/N(XI), F/N(XQ), F/N(YI), and F/N(YQ). The DSP control unit 122 controls the adjustment values of the adjustment units 114, 116 for each tributary of the DSP 110 simultaneously, taking advantage of the fact that the monitors are generated in respective independent spectral regions around respective values F/N(XI), F/N(XQ), F/N(YI), and F/N (YQ).

In an alternative implementation, the values N(XI), N(XQ), N(YI), and N(YQ) are equal. The DSP control unit 122 controls the adjustment values of the adjustment units 114, 116 for each tributary of the DSP 110 one after the other, using the selective addition on one tributary at a time.

Alternatively, the DSP control unit 122 in the optical transmitter 100 continuously controls the adjustment units 114, 116. Alternatively, the DSP control unit 122 in the optical transmitter 100 continuously controls the adjustment units 114, 116 only during discrete period of time. When the adjustment units 114, 116 are not controlled, the selective addition unit 118 is bypassed. For instance, the discrete period of time can be set at one second duration every 12 hours. Taking advantage of the fact that low frequency components are imprinted in digital domain, the control can be gated in order to reduce any penalty appearing during the control operation.

Alternatively, the receiver control unit 624 monitors the number of errors corrected by the FEC of the receiver DSP 623. This value is provided for the DSP control unit 122 in the optical transmitter 100 through the transmitter control unit 153. If the number of errors is below a threshold defined according to system margin, the DSP unit 122 in the optical transmitter 100 continuously controls the adjustment units 114, 116. Alternatively, the number of errors, which have been corrected by the FEC process in the receiver DSP 623 of the receiver 620 receiving the lightwave signal 603, is sent to the controller 630 through a higher network layer. This value is provided for the DSP control unit 122 in the optical transmitter 100 through the transmitter controlling unit 153. If the number of errors is below a threshold defined according to system margin, the DSP control unit 122 in the optical transmitter 100 continuously controls the adjustment units 114, 116. Taking advantage of the fact that low frequency components are imprinted in digital domain, the control can be integrated with FEC monitor and gated in order to reduce any penalty appearing during the control operation.

Alternatively, the transponder 600 emits PM-8QAM signals in a first time and the DSP control unit 122 in the optical transmitter 100 controls the adjustment units 114, 116 in order to compensate ideally the imperfection of the linearity. And then, the controller 630 commands the settings of the transponder 600 so that it may receive PM-16QAM signals. The DSP control unit 122 of the optical transmitter 100 still controls the adjustment units 114, 116 independently of the modulation format in order to compensate ideally the imperfections of the linearity.

Alternatively, the transmitter 610 is identical with the optical transmitter 200 shown in FIG. 6. The linearity compensation unit 215 uses the LUT stored in the control unit 222, which is not optimized for the specific optical transmitter 200. The non-optimized LUTs are generated during the calibration of another transmitter. During the calibration process of the transponder 600, the optical transmitter 200 is calibrated by repeating control with the control unit 222. The coefficients of the LUT of the linearity compensation 215 are recursively optimized according to the monitor signals provided by the monitor generation unit 231.

Figure 8:
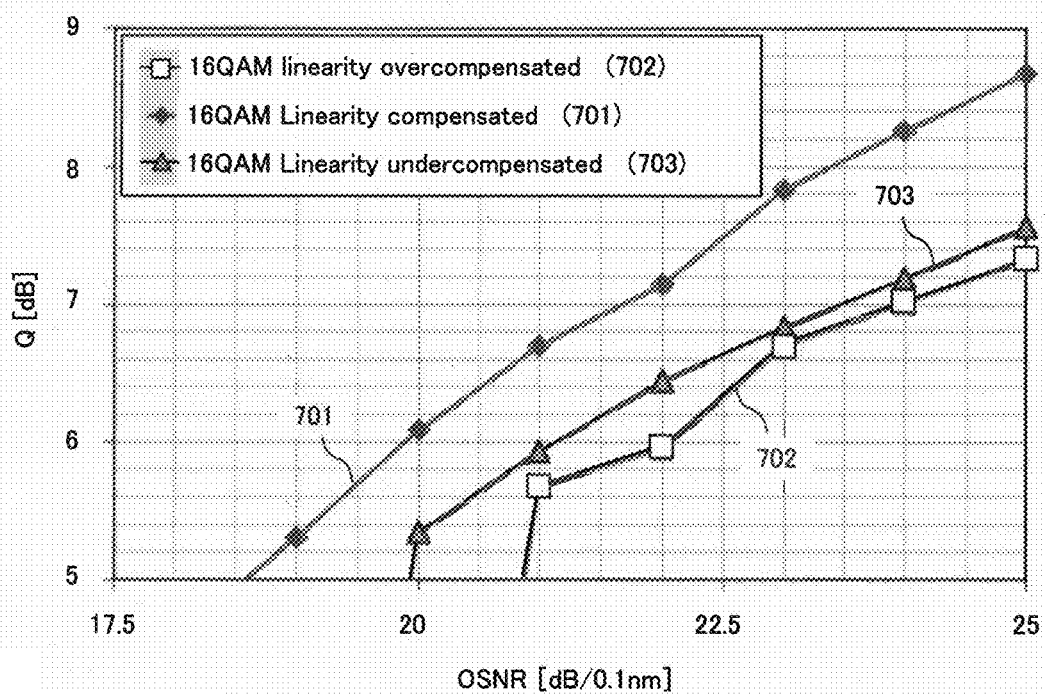
FIG. 8 is a graph illustrating quality factors of signals received by the transponder in accordance with the fourth exemplary embodiment of the present invention.

FIG. 8 is a graph illustrating quality factors of signals received by the transponder 600 shown in FIG. 7 according to the present exemplary embodiment. FIG. 8 shows curves 701, 702, and 703 which represent experimental results of reception and demodulation of 32 Gbaud PM-16QAM with a transponder schematized on FIG. 7. The curves 701, 702, and 703 show received signal quality calculated from the received bit error rate against optical signal noise ratio (OSNR). The curve 701 shows the results for optimal compensation of the imperfections of the linearity in the transmitter 610. The curve 702 shows results for cases where the linearity is overcompensated. The curve 703 shows results for cases where the linearity is undercompensated. For instance, for a given OSNR condition of 21 dB/0.1 nm, the degradation of Q factor caused by non-ideally compensated imperfections of the linearity is more than 0.7 dB. This shows that the compensation of the imperfection of the linearity is maintained optimal during the operation of the transmitter 610 according to the present exemplary embodiment, despite variations due to ageing and changes in operation conditions, and the compensation enables to increase system margin. The increase in margin enables to apply the system featuring the exemplary embodiments to wider application ranges and longer distances. Furthermore, application of the exemplary embodiments enables to use components having wider variation of linear characteristics used for the transmitter 610, which enables cost reduction and assures wider source of components.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST 10, 100, 200 optical transmitter
20 selective addition unit
30 data processing unit
40 driving signal unit
50 modulator
60 controller
101 binary data stream
102, 603 lightwave signal
110, 210 DSP
111 serializer/deserializer
112 coding unit
113, 117, 119 DSP unit
114, 116 adjustment unit
115 LUT unit
118 selective addition unit
120 digital to analog converter (DAC)
121, 221 addition coefficient unit
122 DSP control unit
123, 223 low frequency clock unit
130 photodiode
131 monitor generation circuit
150, 622 laser
151, 251 modulator
152 tap unit
153 transmitter control unit
161, 162, 163, 164 amplifier
215 linearity compensation unit
222 control unit
230 low speed control DSP
231 monitor generation unit
252 automatic bias control (ABC) circuit
600 transponder
604 data steam
605 client interface
610 transmitter
620 receiver
621 coherent receiver
623 receiver DSP
624 receiver control unit
630 controller

The invention claimed is:

1. An optical transmitter, comprising:
hardware, including a processor and memory;
a selective addition section implemented at least by the hardware and configured to add a coefficient to digital data to be transmitted if the digital data being included in one of data intervals of predetermined number, the predetermined number being integer more than one, and for changing the coefficient with a period longer than the symbol period of the data transmitted by the optical transmitter;
a data processing section implemented at least by the hardware and configured to process the digital data by using a parameter;
a driving signal section implemented at least by the hardware and configured to generate a driving signal from the digital data adjusted by the selective addition section and the data processing section;
a modulator configured to modulate light into lightwave signal by the driving signal; and
a controller configured to receive a monitor signal obtained by monitoring the lightwave signal having a frequency component determined by the period of changing the added coefficients, and modify the parameter of the data processing section in order for the monitor signal to reach an extremum.

2. The optical transmitter according to claim 1, wherein the data processing section comprises
a coding section configured to obtain a data value by coding the digital data;
a constant lookup table for making a correlation between an input data value inputted into the constant lookup table and an output data value output from the constant lookup table; and an adjustment section configured to multiply the input data value and the output data value by multiplying parameter as the parameter.

3. The optical transmitter according to claim 1, wherein, the selective addition section is to obtain a data value of at least one of the data intervals by coding the digital data corresponding to the driving signal for average of maximum and of minimum transmission of lightwave by the modulator.

4. The optical transmitter according to claim 3, wherein, a first coefficient is added by the selective addition section to the digital data in one data interval, and a second coefficient opposite in sign to the first coefficient is added by the selective addition section to the digital data in another data interval.

5. The optical transmitter according to claim 3, wherein the selective addition section is further to:
generate a plurality of tributaries of the digital data;
wherein a different value of the coefficient is added by the selective addition section to each of the plurality of tributaries of the digital data; and
the period of changing the coefficient differs among the plurality of tributaries of the digital data.

6. The optical transmitter according to claim 3, wherein the data processing section is further to:
obtain a data value by coding the digital data;
prepare a constant lookup table making a correlation between an input data value inputted into the constant lookup table and an output data value output from the constant lookup table; and
multiply the input data value and the output data value by multiplying parameter as the parameter.

7. The optical transmitter according to claim 3, wherein the data processing section is further to:
perform a functional calculation over the digital data using a setting parameter as the parameter.

8. The optical transmitter according to claim 1, wherein, at least one of the data intervals is comprised between
the data value obtained by the selective addition section coding the digital data corresponding to the driving signal for average of maximum and of minimum transmission of lightwave by the modulator
and the data value obtained by the selective addition section coding the digital data corresponding to the driving signal for maximum transmission by the modulator.

9. The optical transmitter according to claim 8, wherein, a first coefficient is added by the selective addition section to the digital data in one data interval, and a second coefficient opposite in sign to the first coefficient is added by the selective addition section to the digital data in another data interval.

10. The optical transmitter according to claim 8, wherein the selective addition section is further to:
generate a plurality of tributaries of the digital data;
wherein a different value of the coefficient is added by the selective addition section to each of the plurality of tributaries of the digital data; and
the period of changing the coefficient differs among the plurality of tributaries of the digital data.

11. The optical transmitter according to claim 8, wherein the data processing section is further to:
obtain a data value by coding the digital data;
prepare a constant lookup table making a correlation between an input data value inputted into the constant lookup table and an output data value output from the constant lookup table; and
multiply the input data value and the output data value by multiplying parameter as the parameter.

12. The optical transmitter according to claim 1, wherein, a first coefficient is added by the selective addition section to the digital data in one data interval, and a second coefficient opposite in sign to the first coefficient is added to the digital data in another data interval.

13. The optical transmitter according to claim 12, wherein the selective addition section is further to:
generate a plurality of tributaries of the digital data;
wherein a different value of the coefficient is added by the selective addition section to each of the plurality of tributaries of the digital data; and
the period of changing the coefficient differs among the plurality of tributaries of the digital data.

14. The optical transmitter according to claim 12, wherein the data processing section is further to:
obtain a data value by coding the digital data;
prepare a constant lookup table making a correlation between an input data value inputted into the constant lookup table and an output data value output from the constant lookup table; and
multiply the input data value and the output data value by multiplying parameter as the parameter.

15. The optical transmitter according to claim 1, wherein the selective addition section is further to:
generate a plurality of tributaries of the digital data;
wherein a different value of the coefficient is added by the selective addition section to each of the plurality of tributaries of the digital data; and
the period of changing the coefficient differs among the plurality of tributaries of the digital data.

16. The optical transmitter according to claim 15, wherein the data processing section is further to:
obtain a data value by coding the digital data;
prepare a constant lookup table making a correlation between an input data value inputted into the constant lookup table and an output data value output from the constant lookup table; and
multiply the input data value and the output data value by multiplying parameter as the parameter.

17. The optical transmitter according to claim 1, wherein the data processing section is further to:
perform a functional calculation over the digital data using a setting parameter as the parameter.

18. The optical transmitter according to claim 1, wherein the data processing section is further to:
perform a calculation over the digital data using a plurality of lookup tables and a multiplying parameter as the parameter.

* * * * *